United States Patent
Esse

(10) Patent No.: US 8,502,424 B2
(45) Date of Patent: Aug. 6, 2013

(54) ELECTRIC MACHINE HAVING SPRAY AND SUMP COOLING

(75) Inventor: Paul Esse, Leutenbach (DE)

(73) Assignee: Robert Bosch GmbH, Stuttgart (DE)

( * ) Notice: Subject to any disclaimer, the term of this patent is extended or adjusted under 35 U.S.C. 154(b) by 234 days.

(21) Appl. No.: 12/991,551

(22) PCT Filed: Apr. 22, 2009

(86) PCT No.: PCT/EP2009/054804
§ 371 (c)(1),
(2), (4) Date: Jan. 25, 2011

(87) PCT Pub. No.: WO2009/135762
PCT Pub. Date: Nov. 12, 2009

(65) Prior Publication Data
US 2011/0148229 A1 Jun. 23, 2011

(30) Foreign Application Priority Data
May 7, 2008 (DE) .......................... 10 2008 001 622

(51) Int. Cl.
*H02K 9/00* (2006.01)
(52) U.S. Cl.
USPC .............................................. 310/54; 310/52
(58) Field of Classification Search
USPC .......................................... 310/52, 54, 58, 64
See application file for complete search history.

(56) References Cited

U.S. PATENT DOCUMENTS

| 6,639,334 | B2 * | 10/2003 | Chen et al. | 310/52 |
| 8,247,934 | B2 * | 8/2012 | Matsui et al. | 310/54 |
| 2007/0278869 | A1 * | 12/2007 | Taketsuna | 310/54 |
| 2009/0184591 | A1 * | 7/2009 | Hoshino et al. | 310/54 |
| 2009/0256433 | A1 * | 10/2009 | Stiesdal | 310/54 |
| 2010/0033040 | A1 * | 2/2010 | Wakita | 310/54 |
| 2010/0264760 | A1 * | 10/2010 | Matsui et al. | 310/54 |

FOREIGN PATENT DOCUMENTS

| DE | 77 35 181 | 2/1978 |
| DE | 198 24 202 | 9/1999 |
| DE | 10 2004 049795 | 11/2005 |
| EP | 1 841 046 | 10/2007 |

OTHER PUBLICATIONS

International Search Report for PCT/EP2009/054804, dated Sep. 29, 2009.

* cited by examiner

*Primary Examiner* — Nguyen N Hanh
(74) *Attorney, Agent, or Firm* — Kenyon & Kenyon LLP

(57) ABSTRACT

An electric machine has a housing, and in the housing has at least one electrical assembly including a rotor, and having a cooling device which, in the lower region of the housing, has a sump pan that is situated or developed there for a coolant. The cooling device further has at least one coolant spray device for spraying the electrical assembly with coolant, the sump pan having a coolant discharge which, during non-operation of the electric machine, feeds the coolant into a coolant reservoir and is dimensioned so that, during operation of the electric machine at a specified coolant volume flow of the coolant spray device, a coolant level, which wets the rotor, sets in the sump pan. A corresponding method is also provided.

7 Claims, 2 Drawing Sheets

ELECTRIC MACHINE HAVING SPRAY AND SUMP COOLING

FIELD OF THE INVENTION

The present invention relates to an electric machine which has a housing and in the housing at least one electrical assembly including a rotor, and having a cooling device which, in the lower region of the housing, has a sump pan situated or developed there for a coolant. The present invention also relates to a corresponding method.

BACKGROUND INFORMATION

For cooling an electric machine, it is known that one may apply oil to electrical assemblies. In the case of nozzle oil cooling, this is achieved by having a plurality of nozzles spraying the electrical assemblies to be cooled using oil. This requires a costly design.

A further possibility is presented by sump cooling, which has a sump into which the electrical assemblies, that are to be cooled, are dipped. Sump cooling requires fluid-level monitoring, which is difficult to implement. Furthermore, at low temperatures the oil becomes viscous and makes the electrical assemblies of the electric machine stick. A stator and a rotor, for example, are made to stick to each other because, in sump cooling, oil is located in an air gap between the stator and the rotor.

It is an object of the present invention to provide a cooling device that is easy to implement, which prevents the sticking of the electrical assemblies.

SUMMARY OF THE INVENTION

According to the present invention, it is provided that the cooling device further has at least one coolant spray device for spraying the electrical assemblies with coolant, the sump pan having a coolant discharge which, during non-operation of the electric machine, feeds the coolant into a coolant reservoir and is dimensioned so that, during operation of the electric machine at a specified coolant volume flow of the coolant spray device, a coolant level, which wets the rotor, sets in the sump pan. Because of the coolant discharge, the present invention makes possible a variable coolant level in the sump pan. During operation of the electric machine, to achieve coolant distribution, the specified coolant flow is sprayed via the coolant spray device into the electric machine. In the process, the coolant discharge prevents the filling up of the electric machine with coolant by feeding coolant from the sump pan into the coolant reservoir. In this context, as much coolant discharges from the sump pan as is needed to adjust the coolant level. If the coolant level is so high that it wets the rotor, the rotor takes over an additional coolant distribution by hurling the coolant onto the electrical assemblies, whereby the air gap between the rotor and the stator fills up with coolant. During non-operation of the electric machine, the coolant discharge conducts the coolant into the coolant reservoir, whereby the coolant level falls so far that the rotor is no longer able to dip into the coolant, and the air gap is free of coolant. Consequently, the sticking of the stator and the rotor to each other is not possible, especially at low temperature, as is present during non-operation. Another advantage is that, as compared to the related art, fewer coolant spray units have to be used in order to achieve the same cooling performance, which leads to simplification in the design.

According to one further development of the present invention, it is provided that the cooling device have coolant circulation.

According to one refinement of the present invention, it is provided that the cooling device have a coolant pump, which is situated according to flow technology between the coolant reservoir and the coolant spray device. The coolant pump conveys the coolant to the coolant spray device and generates the pressure required to spray the electrical assemblies with coolant. In the process, the pump obtains coolant from the coolant reservoir.

According to another refinement of the present invention, it is provided that the sump pan have a coolant overflow, which is connected to the coolant reservoir in a communicating manner. The coolant overflow limits the coolant level to a maximum, by feeding the excess coolant, which would let the coolant level rise further, into the coolant reservoir.

According to one refinement of the present invention, it is provided that the coolant be a cooling lubricant, especially an oil. It is of advantage to use a cooling lubricant, since wear of movable parts of the electric machine is reduced thereby.

According to another refinement of the present invention, it is provided that the electric machine be developed as the electric drive of a hybrid drive of a motor vehicle.

Moreover, a method is provided which is provided for cooling and/or lubrication of an electric machine that corresponds to one or more of the preceding descriptions, the electric machine having a housing and in the housing having at least one electrical assembly including a rotor, and having a cooling device which, in the lower region of the housing, has a sump pan situated or developed there for a coolant. According to the present invention, the method provides that the cooling device sprays the electrical assembly with coolant, using a coolant spray device, the coolant discharging from the sump pan when the electric machine is not being operated and being fed into a coolant reservoir, in the case of the operated electric machine, the discharge process being selected while taking into account the specification of the coolant volume flow of the coolant spray device, in such a rapid manner that a coolant level is generated in the sump pan which wets the rotor with coolant. During non-operation of the electric machine, the coolant level in the sump pan falls off so far, or the sump pan runs empty, so that in each case the rotor is not wetted with coolant that is at rest.

DETAILED DESCRIPTION

Figure 1:
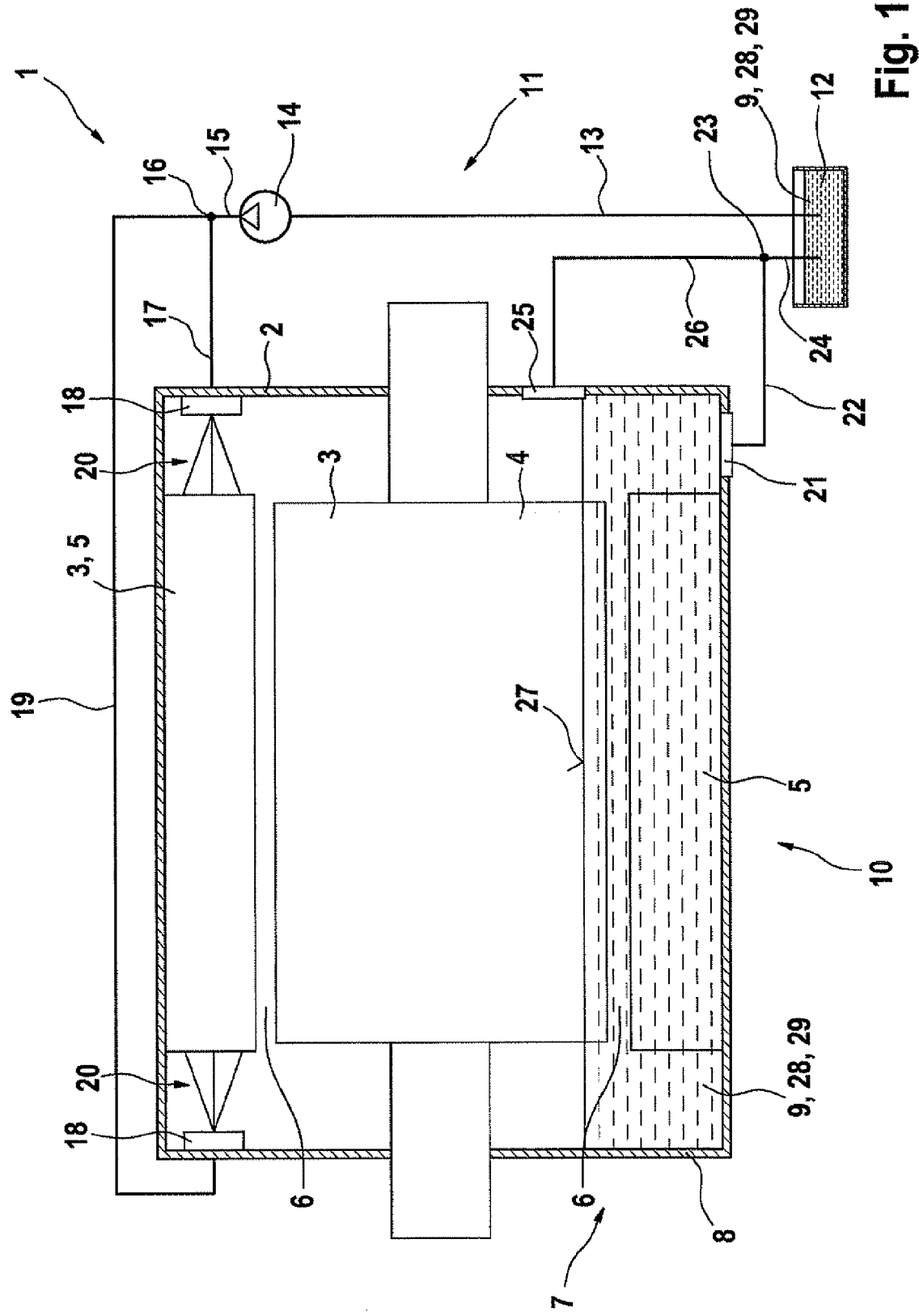
FIG. 1 shows a longitudinal section of the electric machine.

FIG. 1 shows an electric machine 1 having a housing 2, which has a first electrical assembly 3, which is designed as a rotor 4. In addition, housing 2 shows a second electrical assembly 3, which is designed as stator 5, an air gap 6 forming between rotor 4 and stator 5, which has a circular cross section. In its lower region 7, housing 2 is developed as a sump pan 8, in which there is a coolant 9. Sump pan 8 and coolant 9 belong to a cooling device 10, which has a coolant circulation 11. Coolant circulation 11 runs from a coolant reservoir 12 to a coolant pump 14 via a line 13. Starting from coolant pump 14, coolant 9 is passed on via a line 15 to a node 16 and from node 16 via a line 17 to a first coolant spray device 18. Furthermore, starting from node 16, coolant 9 is conveyed via a line 19 to a second coolant spray device 18. Coolant spray devices 18 each generate a coolant spray jet 20, which sprays stator 5 with coolant 9. After that, coolant 9 drips into sump pan 8. Sump pan 8 has a coolant discharge 21, which is connected in a communicating manner to coolant reservoir 12 via a line 22 to a node 23, and starting from node 23 via a line 24. Coolant discharge 21 is mounted at the lowest point of sump pan 8. Furthermore, sump pan 8 has a coolant overflow 25, which is connected in a communicating manner via a line 26 to node 23 and thus also to coolant reservoir 12. This closes coolant circulation 11. A coolant level 27 is dimensioned in such a way, in this instance, that rotor 4 dips into coolant 9, whereby rotor 4 is wetted with coolant 9.

In the specific embodiment shown, coolant 9 is furthermore embodied as cooling lubricant 28, which is an oil 29. In the operation of electric machine 1, coolant pump 14 conveys oil 29 to coolant spray devices 18, which cool stator 5 using coolant spray jets 20. Oil 29 applied in this manner drips from stator 5 into sump pan 8 within housing 2, and from there oil 29 is fed via coolant discharge 21 into coolant reservoir 12 via line 22 and 24. Coolant pump 14 obtains oil 29 from coolant reservoir 12 via line 13, whereby coolant circulation 11 is closed. If coolant pump 14 conveys more coolant 9 into housing 2 than is able to discharge via coolant discharge 21, coolant level 27 rises. Coolant pump 14 thus generates a coolant volume flow which sets coolant level 27 in sump pan 8. If coolant level 27 has risen so far that rotor 4 is able to dip in regions, and thus a part of air gap 6 is filled with oil 29, rotor 4 distributes oil 29 within housing 2 in response to rotation. In order to avoid the filling up of housing 2 with oil 29, coolant overflow 25 is provided which is mounted in such a way that excess oil 29 runs back into coolant reservoir 12 beginning at a certain coolant level 27, via lines 26 and 24. If coolant pump 14 conveys a lesser coolant volume flow than is being discharged via discharge 21, coolant level 27 drops, whereby the rotor is no longer dipping into oil 29, and air gap 6 becomes free of oil. This occurs particularly during non-operation of electric machine 1, since then there is no coolant volume flow. In this way it is prevented that rotor 4 and stator 5 are stuck to each other by oil 29 at low temperature, when the oil has a high viscosity due to the low temperature.

Figure 2:
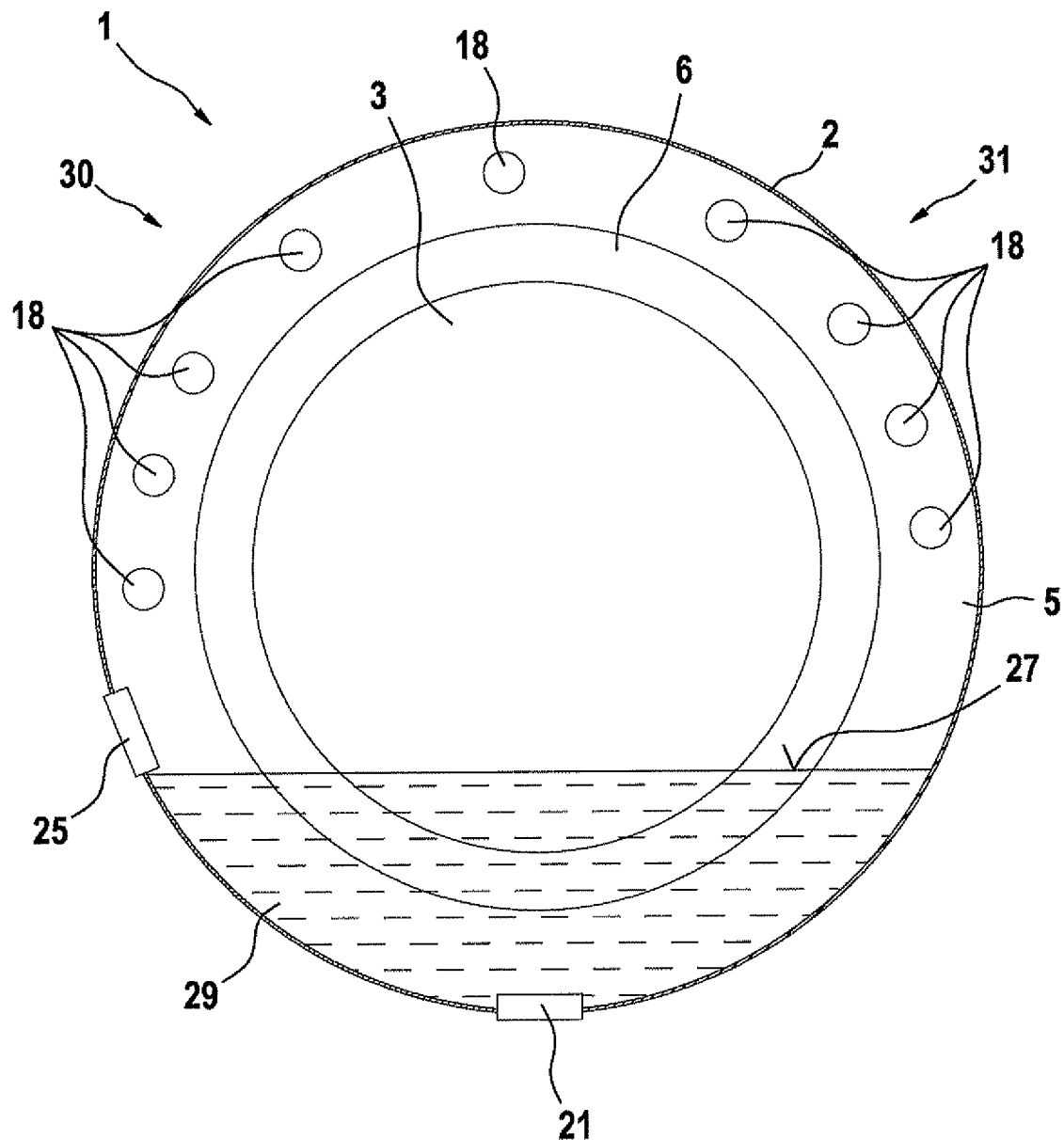
FIG. 2 shows a cross section of the electric machine.

FIG. 2 shows a cross sectional view of electric machine 1. The cross sectional view makes clear the form of the cross section of air gap 6, and shows an arrangement 30 of a plurality of coolant spray devices 18. Coolant spray devices 18, in this instance, are situated in such a way that they are arranged along upper region 31 of stator 5 and predominantly spray stator 5 with oil 29. Moreover, FIG. 2 shows an additional coolant overflow 25, which is mounted laterally on housing 2.

What is claimed is:

1. An electric machine comprising:
   a housing;
   at least one electrical assembly including a rotor, situated in the housing; and
   a cooling device which, in a lower region of the housing, includes a sump pan situated there for a coolant, the cooling device further including at least one coolant spray device for spraying the electrical assembly with coolant, the sump pan having a coolant discharge which, during non-operation of the electric machine, feeds the coolant into a coolant reservoir and is dimensioned so that, during operation of the electric machine, at a specified coolant volume flow of the coolant spray device, a coolant level, which wets the rotor, sets in the sump pan.

2. The electric machine according to claim 1, wherein the cooling device has a coolant circulation.

3. The electric machine according to claim 1, wherein the cooling device has a coolant pump, which is situated according to flow technology between the coolant reservoir and the coolant spray device.

4. The electric machine according to claim 1, wherein the sump pan has a coolant overflow, which is connected in a communicating manner to the coolant reservoir.

5. The electric machine according to claim 1, wherein the coolant is a cooling lubricant, including an oil.

6. An electric machine according to claim 1, wherein the electric machine is an electric drive of a hybrid drive of a motor vehicle.

7. A method for at least one of cooling and lubricating an electric machine, the electric machine having a housing and in the housing at least one electrical assembly including a rotor, and having a cooling device which, in a lower region of the housing, has a sump pan situated there for a coolant, the method comprising:
   spraying the electrical assembly with coolant from the cooling device, using a coolant spray device, the coolant discharging from the sump pan when the electric machine is not being operated and being fed into a coolant reservoir; and
   when the electric machine is being operated, selecting a discharge process, while taking into account a specification of a coolant volume flow of the coolant spray device, in such a rapid manner that a coolant level is generated in the sump pan which wets the rotor with coolant.

* * * * *

UNITED STATES PATENT AND TRADEMARK OFFICE
CERTIFICATE OF CORRECTION

PATENT NO. : 8,502,424 B2 Page 1 of 1
APPLICATION NO. : 12/991551
DATED : August 6, 2013
INVENTOR(S) : Paul Esse It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 248 days.

Signed and Sealed this

Fifteenth Day of September, 2015

Michelle K. Lee
*Director of the United States Patent and Trademark Office*